Sept. 13, 1938.　　　　P. MAX　　　　2,130,143

DYNAMO KINEMATIC TRANSFORMER

Filed Jan. 11, 1937

INVENTOR
PIERRE MAX
By Chatwin & Company
Attys

Patented Sept. 13, 1938

2,130,143

UNITED STATES PATENT OFFICE 2,130,143

DYNAMO KINEMATIC TRANSFORMER

Pierre Max, Marseille, France

Application January 11, 1937, Serial No. 120,126
In France January 21, 1936

4 Claims. (Cl. 74—259)

The present invention has for object an arrangement which permits of obtaining in a continuous and automatic manner equilibrium between the work produced by a motor and that absorbed by a resistance which the said motor must overcome in the same sense, this equilibrium taking place for the running of the motor at its maximum output if one exists, which is equivalent to saying that this arrangement is an automatic and continuous change speed.

This arrangement consists of a shaft integral with the motor and a shaft connected with the resistance and which shafts may be arranged one in prolongation of the other. The resisting shaft or the driving shaft carries a weight member, loose thereon and which acts on the driving shaft for the purpose of driving the resisting shaft.

Figure 1:
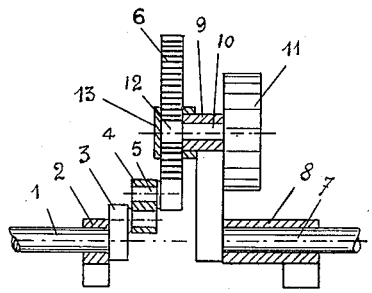
Figure 2:
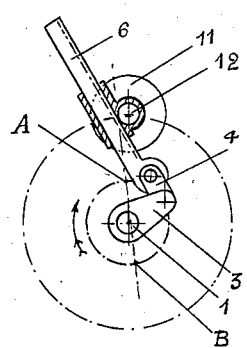
Figure 3:
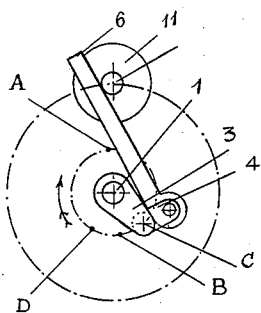
Figure 4:
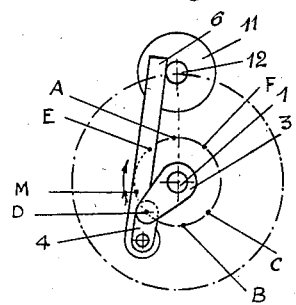
Figure 5:
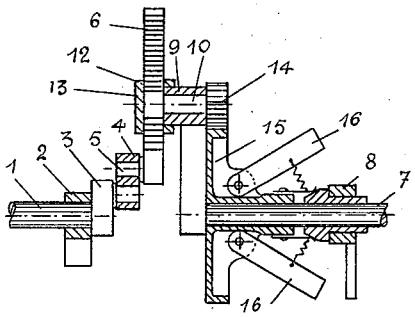
Figure 6:
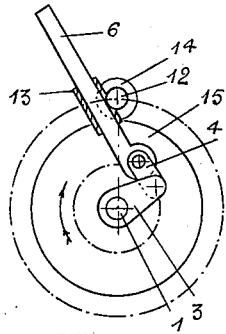
Figure 7:
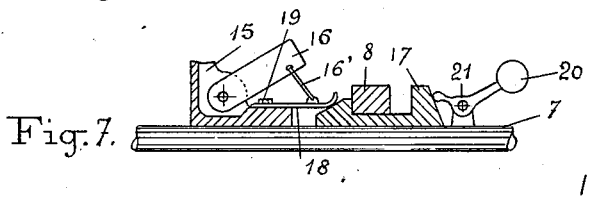

In order to be able to readily follow the description of the operation, Figures 1, 2, 3 and 4 of the accompanying drawing show diagrammatically a possible form of construction, Figure 1 being a section and Figs. 2, 3 and 4 being front views showing the phases of operation. Fig. 5 illustrates the means for automatically altering the size of the flywheel. Fig. 6 is a similar view to Fig. 2 parts being removed and Fig. 7 represents a modification.

In Figs. 1 and 2, the driving shaft 1 supported by its bearings 2, carries at the extremity a crank handle or operating knob 3 which receives a small rod 4 articulated by its other end to the trunnion 5 situated at the end of a rack 6.

The resistance shaft 7 arranged in alignment with the shaft 1 and supported by a bearing 8, carries an arm 9, at the end of which is disposed a bearing in which easily turns a spindle 10 on which are secured, on the one hand a flywheel 11 and on the other hand a toothed pinion wheel 12, which is constantly in mesh with the rack 6 by the action of a system of slides 13.

In the description of the operation which follows it is admitted that the motor couple and the resistance couple are constant and of opposite sign, that the direction of the motor couple is that indicated by the arrow on Figs. 2, 3, 4, and 6. Further it is admitted that the resistance couple is greater than the motor couple, a thing which can always be obtained by a suitable demultiplication either between the motor and the driving shaft 1 or between the resistance shaft 7 and the apparatus creating the resistance which it has to drive.

Operation.—In Fig. 2 the crank handle 3 situated between the upper dead centre A and the lower dead centre B pursues its movement in the direction of the arrow. The rotation of this crank handle 3 drives the rack arm 6 which drives the spindle 10, and therefore the flywheel 11, with a rotary movement. To drive this flywheel 11 the motor must pull on the rack arm 6 and therefore will tend to drive the whole resistance assembly in the direction of the arrow.

When the crank handle 3 comes in the neighborhood of the lower dead centre B and in spite of the driving couple, it will pull on the rack arm 6 and consequently the flywheel 11 more and more slowly so that if this rack arm 6 were directly mounted on the crank handle 3 there would occur a moment when, by virtue of the speed acquired, the flywheel 11 would push the driving shaft and the resisting or driven shaft in the direction which would result in the loss of part of the traction which the motor had originally exerted on the resistance; further, when the crank handle 3 reaches the lower dead centre B it will suddenly reverse the direction of movement of the flywhel 11 and cause a considerable effort but without appreciable kinetic effect because it will pass through the line of the dead centres, that is to say, through the general axis of rotation of the system, whereas this reaction would cause a dynamic effect capable of causing the destruction of the apparatus.

It is for this reason that the connection of the rack arm 6 with the crank handle 3 is effected through the intermediary of the arm 4 the purpose of which is as follows: by referring to Fig. 3 it will be seen that when the crank handle 3 reaches a point C in the neighborhood of the lower dead centre B and for which point C the flywheel 11 pushes the rack arm 6 faster than the crank handle 3 can pull it, the small arm 4 in rotating about the crank handle permits of a provisional release of this crank handle with the rack arm 6.

Still referring to Fig. 3, the length of the arm 4 should be sufficient to allow the rack arm to continue its movement while nevertheless leaving the crank handle 3 the time necessary to reach a point D (see Fig. 4) sufficiently far away from B so that the connection is re-established between the crank handle which rises towards A and the rack arm which continues to descend, the reaction passing sufficiently far from the centre of rotation of the system to provide a suitable kinematic effect.

Presuming D to be the point where the connection between the crank and the rack arm is re-established (Fig. 4): At this moment the crank handle 3 tends to reverse the direction of rotation of the flywheel 11 while the latter tends to reverse that of the crank handle 3 and consequently that of the motor. From this antagonism will be created a couple which will tend to drive the resistance in the direction of the arrow by acting on the motor. Simultaneously the motor will have slowed down its speed until the rotation of the flywheel 11 becomes nil, then by reason of its couple, the motor will pursue its rotation by pushing the rack arm 6 which itself will drive the flywheel 11 but this time in the opposite direction to formerly and there will develop during this time, a reaction which will tend again to drive the resistance in the direction of the arrow.

Finally when the crank handle 3 arrives at point E, see Fig. 4, in the neighborhood of the upper dead centre A, the divergence between the crank handle 3 and the rack arm 6 takes place by reason of the set of arms 4 and that occurs up to a certain point F after which the phenomena which have occurred between D and F will occur between F and D.

During the operation hereinabove described, it has been implicitly admitted that the inertia of the motor was sufficient for this motor, if it slowed down, not to change its direction of rotation since most industrial motors, not being reversible, there would be serious inconveniences in practice against such a reversal of running.

It will therefore be seen from what has been herein set forth, that, except in the neighborhood of the dead centres, that is to say, between C and D, then between E and F, where the connection efforts are momentarily cancelled, the couples which are created from the reactions always tend to act on the motor to overcome the resistance effort.

From this and it being supposed that the couples are always constant it must be shown:

1. That there will be established a stable regime of operation for which the motive power will be entirely transmitted to the resistance.
2. That this regime can be made to coincide with the regime of maximum output of the motor if there is one.
3. That the motor couple being constant, the regime of maximum output can be maintained when the resisting couple varies.

The above three conditions may be explained as follows:

1. There occurs a regime of equilibrium of operation. In fact: given V the relative speed of the motor in relation to the resistance at the points C and E of release.

If at a predetermined moment the motor has not been able to transmit all the energy which it produces its speed will increase because there will remain a certain quantity of residual energy.

This increase in speed will engender an increase in the amount of resistance but nevertheless smaller than the increase in speed of the motor owing to the fact that the resistance couple is greater than the motor couple.

Therefore to define the ideas: V1, V2, V3, etc., the relative speeds of the motor at the successive passages of the points C and E at the times $t1$, $t2$, $t3$, etc., and presuming again that:

$$V2 = 2 \times V1$$
$$V3 = 3 \times V1, \text{ etc.}$$

In these conditions, the absolute speed $v$ imposed on the flywheel 11 will increase in the same proportions:

$$v2 = 2 \times v1$$
$$v3 = 3 \times v1, \text{ etc.}$$

Now since at each half turn of the motor the speed of the flywheel 11 becomes nil, the energy which it will replace (and which is not recuperated by the motor) will increase as:

$$\tfrac{1}{2} \times m \times v1^2$$
$$\tfrac{1}{2} \times m \times 4 \times v1^2$$
$$\tfrac{1}{2} \times m \times 9 \times v1^2$$

$m$ being the moment of inertia of the flywheel 11 in relation to the axis 10 of rotation.

During this time and at each relative half turn, the motor will increase its speed (absolute speed) by the amount V1 more than the absolute increase in speed of the resistance which latter will be lower than the increase V1 as has been stated previously herein owing to the fact that the resistance couple is greater than the motor couple.

So that at each relative half turn of the motor, its energy will increase in a progression the terms of which will be comprised between V1 and $2 \times V1$, V2 and $2 \times V2$, V3 and $2 \times V3$, etc.

Now, not only should the motor furnish the flywheel 11 with the energy which it will no more recuperate but it should furnish during this time and directly to the resistance a certain amount of energy Q all the greater as the flywheel 11 opposes the movement which is imposed on it.

As $v$ and V are bound by a constant coefficient $k$ which depends on the geometrical dimensions of the system, it follows that when the energy transmitted increases in the following proportion $$Q1 + k \times \tfrac{1}{2} m \times V1^2$$
$$Q2 + k \times \tfrac{1}{2} m \times 4 \times V1^2$$
$$Q3 + k \times \tfrac{1}{2} m \times 9 \times V1^2, \text{ etc.}$$

the energy produced by the motor couple will increase only in proportions always lower than the following progression:

$$2 \times V1$$
$$4 \times V1$$
$$6 \times V1, \text{ etc.}$$

If then the motor were to continue to accelerate there would come a moment where the energy transmitted would equalize the energy produced by the motor. There would at that moment occur a regime of stable equilibrium of running.

2. This regime can be brought to coincide with the regime of maximum output of the motor if there be one.

In fact if the moment of inertia of the flywheel 11 were greater or smaller than the value $m$ previously considered the stable equilibrium would occur for a slower or greater speed of the motor by virtue of the relations previously established.

In particular, this equilibrium could be caused to occur for a maximum output of the motor by determining the flywheel in a suitable manner.

3. The motor couple remaining constant, the regime of maximum output can be maintained when the resistance couple varies:

For that purpose it will be supposed that the equilibrium has taken place for the maximum value of the resistance couple and for the regime of maximum output of the motor.

If then the resistance couple diminishes in value, the resistance shaft will find its speed increased; the equilibrium will be upset; the motor will accelerate its speed beyond that of its maximum efficiency regime in order to reach a speed at which it can transmit all its energy.

If the resistance couple ceases to slacken or decrease so as to retain a determined value, the motor could continue to accelerate until it has found its regime of equilibrium. If it is desired to return this regime to that of maximum efficiency, it would be necessary to increase the size of the flywheel 11. So that this variation in size of the flywheel 11 can occur automatically one may imagine a device of which Figs. 5, 6 and 7 give a diagrammatic example.

Fig. 5 shows the arrangement in longitudinal view and cut through the planes passing through the axes of the members likewise visible on the end view in Fig. 6. Nevertheless in Fig. 6 certain parts have not been shown in order to render it clearer.

By referring to Fig. 5, 1 represents the driving shaft, 2 represents one of the bearings supporting this shaft, 3 represents the crank handle terminating the driving shaft and on which is placed the arm 4 which connects the shaft 1 to the crank rod 3. On the resistance side will be seen the resistance shaft 7 supported by one of its bearings 8, then the arm 9 at the extremity of which is arranged the housing for the axis 10. This axis 10 carries, as in Fig. 1, a pinion wheel 12 constantly in mesh with the rack 6 and the slide 13 but in place of the flywheel 11 is a second pinion wheel 14 secured on the axis 10. This pinion wheel 14 meshes with a toothed plate 15 mounted loose on the shaft 7, this plate serving the same purpose as the flywheel 11 but in addition it increases its moment of inertia by the spreading apart of the fly-weights 16 mounted thereon. This spreading apart can take place by means of a mechanism which cannot be illustrated owing to the small size of Fig. 5 and it has therefore been shown in Fig. 7 which represents to an enlarged half section, such mechanism mounted on the resistance shaft 7.

On Fig. 7 is therefore shown one of the fly-weights or governors 16 secured to the plate 15 by means of an articulation which permits it to move more or less away from the general axis of rotation of the device. This plate 15 carries on its sleeve portion a strong flat spring 18 secured firmly by means of a screw 19. This spring 18 is connected to the governor 16 by means of a rod 16' and its raised extremity bears on a conical sleeve 17 integral with the resistance shaft 7 but able to move or slide along such shaft by a certain amount by means of a sliding key.

An elbow lever 20, articulated in a stirrup 21 of the shaft 7 carries at its extremity a heavy weight and the other extremity rests on the conical sleeve 17.

The operation is then as follows: The flat spring 18 being presumed to be strong enough not to give under centrifugal force exerted on the weights 16, rests on the sleeve 17 which is pushed to its maximum backward movement in Fig. 7.

If the resistance couple diminishes, the resistance shaft will increase its speed as well as the motor shaft which latter will thus depart from its regime of maximum efficiency.

But the increase in speed of the resistance shaft will increase the centrifugal force which occurs on the elbow lever 20, the latter will push to the left (Fig. 7) the conical sleeve 17; in this movement the sleeve will lift the spring 18 which will permit of liberating to some extent the weight 16.

This weight in moving away from the general axis of rotation, will increase the moment of inertia of the plate 15 with which it is integral which will bring the speed of equilibrium of the motor to the regime of maximum efficiency if the mechanism has been suitably chosen.

Finally if the motor couple varied instead of remaining constant as was supposed up to now, it would still be possible to provide for it a regime of satisfactory working by replacing, for example, the rod 16' by a coiled and loaded spring which would tend to return the weight 16 towards the general axis of rotation of the system. In this manner when the speed of the motor slackened by the diminution of its couple there would follow a diminution of the speed relatively to the alternative movement of the plate 15 and as a result a diminution of the centrifugal force occurring on the weight 16 by the fact of this alternative speed.

The weight 16 will then be brought back towards the centre by the action of the loaded coil spring which, by diminishing the moment of inertia of the plate 15 will permit the motor to attain an improved speed in relation to that which it would have if this latter device did not intervene. So that at the variations of the motor couple and of the resistance couple this double action of the regulating mechanism intervenes in a manner all the more efficacious as the parts are more carefully selected.

I claim:

1. A dynamo kinematic transformer comprising a driving shaft, a crank arm carried by said driving shaft, a sliding rack arm, a link member connecting said crank arm with said sliding rack arm, a pinion wheel constantly meshing with said rack arm, a flywheel, said pinion in driving engagement with said flywheel, the link member allowing the rack arm to move for a short period so as to respond to oscillatory movement imparted thereto, the resultant force being communicated from the rack arm to a driven shaft.

2. A dynamo kinetic transformer as claimed in claim 1 including bearings for the rack arm, a spindle carrying at one end the pinion wheel, the rack arm bearings and the spindle bearings being integral, the rack arm sliding in said bearings, the flywheel being carried by the other end of said spindle, a driven shaft, an arm carried by said driven shaft, said driven shaft being mounted in bearings in line with the driving shaft.

3. A dynamo kinetic transformer as claimed in claim 1 including flyweights mounted on the flywheel, the inertia of the flywheel being varied correspondingly to its angular speed by said flyweights, said flyweights being pivotally mounted on said flywheel, a stirrup integral with the driven shaft, a bell crank lever pivoted on said stirrup, said bell crank lever moving apart the flyweights, said bell crank lever being weighted on one arm, a conical ended sleeve on the driven shaft, said bell crank lever resting by its other arm on one conical end of said sleeve, said conical ended sleeve being splined to the driven shaft and flat springs secured on the flywheel and connected to the flyweights bearing against the other conical end of said sleeve, outward movement of the weighted arm of the bell crank lever by centrifugal force moving the sleeve along the driven shaft spreading apart the flyweights.

4. A dynamo kinetic transformer as claimed in claim 1 including a second pinion wheel mounted on the spindle of the first pinion wheel, said second pinion wheel meshing with the toothed periphery of the flywheel.

PIERRE MAX.